United States Patent [19]

DeNale et al.

[11] Patent Number: 4,866,236

[45] Date of Patent: Sep. 12, 1989

[54] FLEXIBLE EXTENDABLE BACKING SHIELD FOR WELDING REACTIVE METALS

[75] Inventors: Robert DeNale, Arnold; William E. Lukens, Annapolis, both of Md.; Luther A. Marsh, Fairfax Station, Va.

[73] Assignee: The United States of America as represented by the Secretary of the Navy, Washington, D.C.

[21] Appl. No.: 183,949

[22] Filed: Apr. 20, 1988

[51] Int. Cl.⁴ .............................................. B23K 9/16
[52] U.S. Cl. .................................... 219/74; 219/136; 219/137.42
[58] Field of Search ............... 219/72, 74, 136, 137.42

[56] References Cited

U.S. PATENT DOCUMENTS

| | | | |
|---|---|---|---|
| 2,918,563 | 12/1959 | Ternisien et al. | 219/74 |
| 3,450,857 | 1/1967 | Webb | 219/74 |
| 3,875,364 | 4/1975 | Boyett | 219/74 |
| 4,599,505 | 7/1986 | Lukens et al. | 219/74 |

FOREIGN PATENT DOCUMENTS 7212845 4/1972 Japan .

OTHER PUBLICATIONS

Welding Handbook, 7th Edition, vol. 4, pp. 451, 452, American Welding Society, Miami, Fla. 33126.

*Primary Examiner*—Clifford C. Shaw
*Attorney, Agent, or Firm*—Luther A. Marsh; John H. Stowe

[57] ABSTRACT

A flexible extendable backing shield for use with the welding of reactive metals such as titanium. The backing shield provides a means for selectively distributing the inert gas along the length of the shield and then diffusing the inert gas to the root side of the weld to prevent oxidation and embrittlement of the weld root. The backing shield is of modular configuration so that a plurality of the devices can be readily connected together to shield a variety of complex shapes.

7 Claims, 1 Drawing Sheet

FLEXIBLE EXTENDABLE BACKING SHIELD FOR WELDING REACTIVE METALS

BACKGROUND OF THE INVENTION

1. Field of the Invention

This invention relates to the welding of reactive metals such as titanium and zirconium and more particularly to a backing shield for the protection of the root of the weld and the adjacent base metal from the atmosphere during welding.

2. Background Information

In the welding of reactive metals such as titanium and zirconium, inert gas shielding is required to protect the root of the weld and the adjacent base metal during welding. One method is by using a temporary backing bar or ring as shown on page 451 of Welding Handbook, 7th Edition, Vol. 4, American Welding Society, Miami, Fla. 33126. As shown therein, the bar is usually made of copper; is incorporated in the fixtures; and, contains a clearance groove under the joint that is purged of air prior to welding. With this method, the reactive metal must be in contact with the backing bar along the bar's entire length to ensure a uniform weld. Further, the root opening of the joint must be near zero to prevent the arc from impinging on and fusing the reactive metal to the backing bar, contaminating and making brittle the reactive metal usually resulting in a cracked weld. The root side of the weld is the side opposite from where the welding energy is normally applied.

A limitation of backing shields of the backing bar type is that such shields are generally specially designed for the particular joint to be welded, resulting in an expensive fabrication process and a large inventory of appropriate shields. When complex specially fabricated backing shields are used and one is damaged during the welding process, delays in production can result because of the delay in repairing or replacing a complex shield. U.S. Pat. No. 3,450,857 to Webb discloses an inert gas shield and pictorially suggests that it may be used as a backing shield. Generally, in Webb, the inert gas is introduced into one end of a cavity and distributed along the length of the cavity by the volume of the cavity. The exit of gas to the work piece is controlled by a flat sintered metal surface having pores in a specified range. It is suggested that steel wool may be used as a form of baffle to equalize the pressure drop along the cavity. With this device, it is necessary to vary the porosity of the flat sintered metal surface in order to vary the flow rate at different places along the length of the cavity. Inert gas shielding is also used for weld side shielding as shown in U.S. Pat. No. 3,875,364 to Boyett. In Boyett, a weld side shield with a rigid enclosure is attached to the trailing edge of an electrode holder. Within the enclosure is a single perforated tube that extends substantially the length of the enclosure and is open at one end. The perforations allow the inert gas to escape into the enclosure in a direction toward the innermost part of the enclosure. The end of the enclosure nearest the electrode is substantially open to allow the inert gas to exit the enclosure and impinge upon the area of the weld pool. The end of the enclosure furthermost from the weld pool is partially open to allow the weld to pass under the furthermost end. The side of the enclosure adjacent the weld is open. Within the enclosure is a mass of metal fibers that surrounds the perforated metal tube and acts as a diffuser for the inert gas. A screen retains the metal fibers within the enclosure at the side adjacent the weld and at the end adjacent the electrode.

There is a need for a backing shield that can evenly distribute the inert gas along its length before the gas is projected in a randomly diffused manner toward the root of the weld; and, further, there is a need for a flexible backing shield which can be readily assembled into complex shapes and which can have segments easily replaced. Applicants' invention illustrates how these needs are met in an efficient and cost effective way.

SUMMARY OF THE INVENTION

The present invention comprises a flexible metal casing capable of being conformed to a wide variety of shapes having an internal distribution system for inert gases further comprising slotted tubes and a substantially uniform thickness of stainless steel wool interposed between the slotted tubes and an open side for diffusing the inert gas to eliminate jets and eddies which cause the aspiration of air into the welding area. Finally, a flexible metal screen retains the steel wool inside the flexible metal casing preventing its contact from the hot reactive metal. The construction of the shield is such that it is easily conformed to the root side of a variety of shapes of metals to be welded. Also the shield is provided with fittings such that a plurality of shields can be cascaded to provide coverage of longer weld joints where necessary without needing a large variety of shields of different lengths and shapes.

More specifically, this invention is a backing shield for applying an inert gas screen to the root side of a weld during the welding of reactive metals, comprising: a flexible metal casing, said casing further comprising a pair of flexible side walls, a flexible bottom, and end walls, said walls and said bottom forming a cavity having a side open toward the root side of said weld; at least one flexible conduit feeding through said end walls and through said cavity, said conduit having a plurality of apertures for selectively distributing said inert gas along the length of said cavity; and, means for diffusing said inert gas for random directional impingement upon said root side of said weld, said means for diffusing interposed between said flexible conduit and said open side of said casing.

It is an object of this invention to provide a flexible extendable backing shield for the welding of reactive metals.

Another object of this invention is to provide a more effective apparatus for inert gas shielding the root of welds during the welding of reactive metals.

Still another object of this invention is to provide an inert gas backing shield that readily conforms to complex shapes.

Yet another object of this invention is to provide an inert gas backing shield that diffuses inert gas in a manner which causes random directional impingement upon the root side of a weld so as to eliminate jets and eddies which cause the aspiration of air into the welding area.

Still another object of this invention is to provide an inert gas backing shield which is easily maintained because of its modular construction.

Other objects and advantages of the invention will be understood more fully from the following description when read in connection with the accompanying drawing.

DETAILED DESCRIPTION OF THE INVENTION

Figure 1:
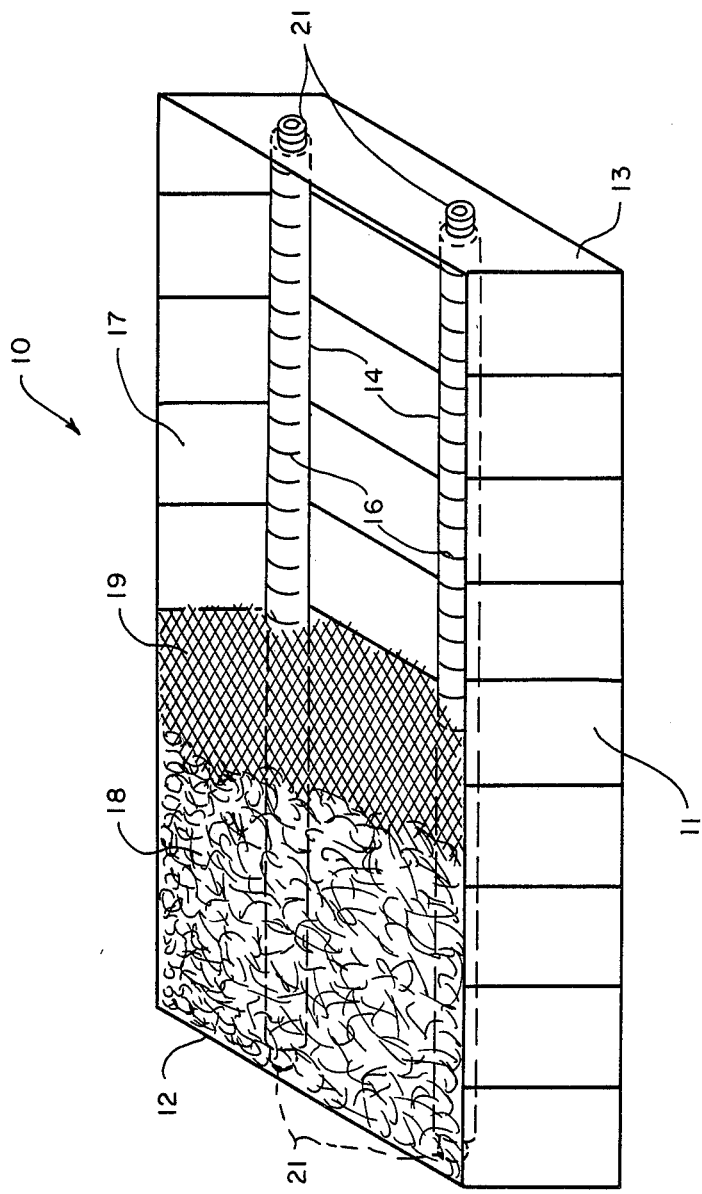
FIG. 1 is a perspective view of the invention shown partially cut-away.

FIG. 1 illustrates the present invention, a flexible extendable backing shield. The invention illustrated generally as 10 is contained in a flexible metal casing 11 made of a suitable material such as stainless steel. The casing is generally closed on the sides, bottom and ends and is open at the top. Although a gas tight seal is not required, it is generally desirable that these surfaces be as gas tight as practical consistent with the requirement that they be flexible. Extending lengthwise from a first end 12 to a second end 13 is at least one flexible conduit 14 for distributing the inert gas along the length of the backing shield 10. Conduit 14 may be made of any suitable material which is adapted for flexibility equal with the flexibility selected for the casing. Conduit 14 is adapted with a plurality of apertures such as slots 16 which allow the inert gas to pass from the conduit into the interior of casing 11. Preferably, the slots are cut transverse to the longitudinal axis of conduit 14. Slots 16 are oriented so that the gas discharge is generally toward open side 17 of casing 11. Various delivery patterns can readily be accomplished by the fabrication of different interchangeable conduits 14 having appropriate aperture opening and spacings. In the preferred embodiment, a plurality of conduits 14 are used to provide better coverage.

Interposed between slotted flexible conduit 14 and the open side 17 of casing 11 is a substantially uniformly thick layer of a randomly oriented fibrous material 18 such as stainless steel wool which provides a random direction diffusion system for the inert gas. By utilizing a substantially uniformly thick layer of the material, the layer can easily be replaced with one of a different density to change the rate of diffusion or to replace a damaged part of the backing shield. The density of the steel wool is selected commensurate with the effective orifice area of slots 16 in conduit 14 to ensure proper inert gas flow along the length of the shield.

Steel wool 18 is retained within casing 11 by a flexible metal mesh 19 which substantially covers the open side 17 of flexible metal casing 11. Since the distribution of the gas is primarily controlled by conduit 14 and steel wool 18, the wire size and the openings in flexible metal mesh 19 are selected for flexibility and physical stability.

Flexible conduit 14 passes entirely through the metal casing 11 and is fitted at each end with gas port means 21. Gas port means 21 is for connection of hoses, not illustrated, to the source of inert gas or for coupling of individual backing shields 10 to form an arrangement involving a plurality of backing shields 10. When the backing shield 10 is used as the last unit in a system comprising a plurality of backing shields, gas port means 21 which is not connected to the source of supply of inert gas or to another backing shield is closed off using a suitable plug so as to prevent the waste of inert gas.

In use, the backing shield 10 is deployed so that the open side 17 of casing 11 which is covered by flexible metal mesh 19 is adjacent the root side of the reactive metals to be welded. Inert gas is forced under pressure into conduit 14, passes through slots 16 into stainless steel wool 18 where it is randomly diffused by steel wool 18 such that a controlled curtain of inert gas passes through flexible metal mesh 19 and impinges on the root side of the weld. Because of the random diffusion of the inert gas, the root side of the weld is flooded with the inert gas which does not contain such a volume of jets and eddies as to induct air into the welding area, thus preventing oxidation of the reactive metal being welded.

Many obvious modifications in the details and arrangement of parts may be made, however, without departing from the true spirit and scope of the invention, as more particularly defined in the appended claims.

What is claimed is:

1. A backing shield for applying an inert gas screen to the root side of a weld during the welding of reactive metals, comprising:

a flexible metal casing, said casing further comprising a pair of flexible side walls, a flexible bottom, and end walls, said walls and said bottom forming a cavity having a side open toward the root side of said weld;

at least one flexible conduit feeding through said end walls and through said cavity, said conduit having a plurality of apertures for selectively distributing said inert gas along the interior length of said cavity; and, means for diffusing said inert gas for random directional impingement upon said root side of said weld, said means for diffusing interposed between said flexible conduit and said open side of said casing.

2. A backing shield for applying an inert gas screen to the root side of a weld during the welding of reactive metals as claimed in claim 1 wherein said means for diffusing is a substantially uniformly thick layer of randomly oriented fibrous material.

3. A backing shield for applying an inert gas screen to the root side of a weld during the welding of reactive metals as claimed in claim 2 wherein said fibrous material is stainless steel wool.

4. A backing shield for applying an inert gas screen to the root side of a weld during the welding of reactive metals as claimed in claim 2 further comprising a flexible metal mesh for retaining said means for diffusing within said cavity.

5. A backing shield for applying an inert gas screen to the root side of a weld during the welding of reactive metals as claimed in claim 1 wherein said apertures in said conduit are slots disposed transverse to the longitudinal axis of said conduit.

6. A backing shield for applying an inert gas screen to the root side of a weld during the welding of reactive metals as claimed in claim 1 wherein said apertures open toward said open side of said cavity.

7. A backing shield for applying an inert gas screen to the root side of a weld during the welding of reactive metals as claimed in claim 1, further comprising a connecting means for cascadedly connecting a plurality of said backing shields forming an extended shield.

* * * * *